April 7, 1925.
E. PALLENBERG
1,532,338
APPARATUS FOR ANIMAL ACROBATS
Filed Aug. 29, 1923
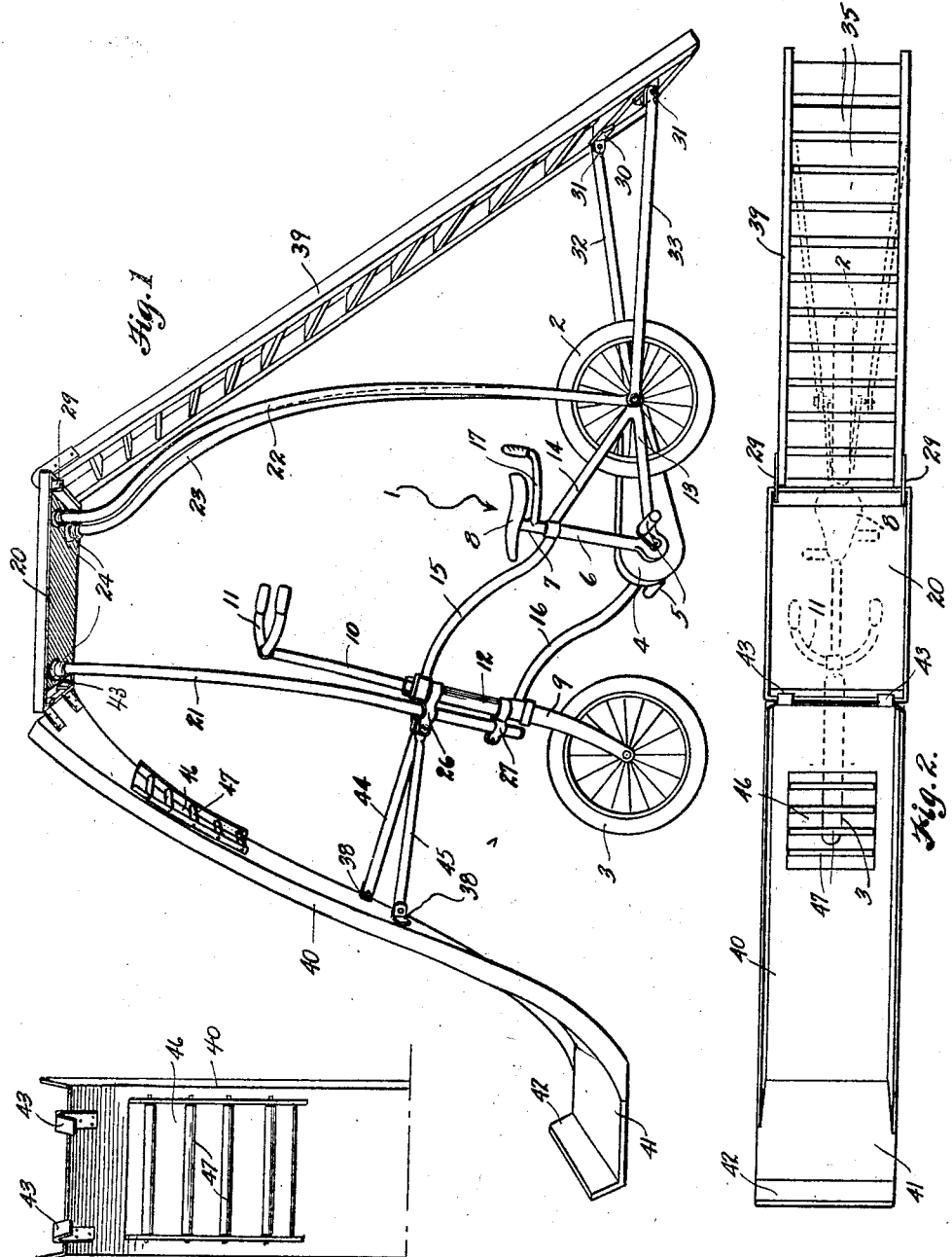
INVENTOR
EMIL PALLENBERG
BY
Richard J. Cook
ATTORNEY Patented Apr. 7, 1925.

1,532,338

UNITED STATES PATENT OFFICE.

EMIL PALLENBERG, OF CLINTON, CONNECTICUT.

APPARATUS FOR ANIMAL ACROBATS.

Application filed August 29, 1923. Serial No. 659,893.

*To all whom it may concern:*

Be it known that I, EMIL PALLENBERG, a citizen of Germany, and a resident of Clinton, Middlesex County, Connecticut, have invented certain new and useful Improvements in Apparatus for Animal Acrobats, of which the following is a specification.

This invention relates to improvements in apparatus for the exhibiting of trained animals, and more particularly to wheeled apparatus of the bicycle order that is designed particularly for trained bears, or the like, which are taught to ride upon and to control the apparatus.

The principal object of this invention is to provide an attachment for the velocipede for animal acrobats on which a patent was issued to me on October 10, 1916, under No. 1,200,970; said attachment to comprise an elevated platform that may be supported from the bicycle frame and which has a ladder leading thereto from the rear and a slide, or chute, leading downwardly at the front of the bicycle.

Another object is to so construct the attachment that it will in no way obstruct the vision or freedom of action of the animal acrobat that rides upon the vehicle while other animals perform on the platform.

Other objects of the invention reside in the various details of construction and combination of parts embodied in the invention and in the provision of means whereby the parts may be readily connected or disconnected to permit them to be collapsed and packed in a minimum amount of space.

In accomplishing these and other objects of the invention, I have provided the improved details of construction, the preferred forms of which are illustrated in the accompanying drawings, wherein—

Figure 1 is a perspective view of an apparatus constructed in accordance with the present invention.

Figure 2 is a plan view of the same.

Figure 3 is a front view of a portion of the chute.

Referring more in detail to the several views of the drawings—

1 designates a bicycle frame which may be of substantially the same construction as the ordinary bicycle frame except for the variation in dimensions which are essential in order to adapt it for its particular use. The frame is supported by a rear driving wheel 2 and a front steering wheel 3. The wheel 2 may be operatively connected for operation by means of a chain and sprocket wheel drive, or any equivalent mechanism which is contained within a housing 4 and which is driven by pedals 5 in the usual manner.

The bicycle frame comprises the usual tubular member 6 wherein there is a seat post 7 on which a seat 8 is mounted. The front wheel 3 is mounted between the forks 9 that are connected with and operated by a steering post 10 to which handle bars 11 are attached. The post 10 is extended rotatably through the tubular front post 12 of the frame, and the rear wheel 2 is mounted between the rear forks 13 and 14 which extend rearwardly from the upper and lower ends of tubular frame member 6 which is rigidly joined with post 12 by means of upper and lower truss members 15 and 16.

To the seat post is fixed a rearwardly extending lever 17 adapted to be grasped by an attendant in maneuvering the apparatus.

The present invention resides chiefly in the combination with the mechanism above described, of an elevated platform and attachments thereto on which trained animals may perform while the bicycle is being manipulated by another trained animal. The platform is designated at 20 and it is supported at its forward end by means of a post 21 and at its rearward end by posts 22 and 23. The upper ends of these posts may be removably applied with socketed members 24 that are fixed to the under side of the platform. At its lower end the post 21 is supported detachably from the front post of the bicycle frame by means of clamps 26 and 27 while the lower ends of the two rearward posts are bent rearwardly and then inwardly and are detachable secured to the outer ends of the axle 28 on which the rear wheel revolves.

In order that an animal may mount the platform I have provided a ladder 39. This is provided at its upper end with hooks 29 adapted to be hooked over the rear edge of the platform, and adjacent its lower end it is provided on its under side with clips 30 that may be detachably connected by bolts 31 with the rearward ends of two bars 32 and 33 that are fixed to the opposite ends of the rear wheel axle. The ladder is provided with closely placed steps or slats 35 on which the animal may climb to the platform.

Leading downwardly from the front of the platform is a chute 40, the lower end of which is turned horizontally, as at 41, and at its end is provided with an upturned stop 42. This chute is detachably fixed at its upper end to the forward end of the platform by downturned hooks 43 and is held rigid by means of two diverging brace bars 44 and 45 that are fixed to clips 38 on its under side and which are detachably attached to the post 21 adjacent its connection with the bicycle frame.

In order that the vision of the animal riding upon the bicycle will not be obstructed by the chute 40, I have provided the latter with an opening 46 that is slightly above the level of the handle bars and across which there is provided a plurality of horizontally mounted rollers 47 that will support the animal as it slides from the platform down the chute, yet will not interfere with the vision of the operating animal on the bicycle.

With the device so constructed, it is apparent that while one of the trained animals is riding upon and operating the bicycle, other animals may mount the platform, by means of the ladder, and may slide down the chute to the landing platform and may jump from this to the floor.

It is readily apparent that various details of construction, dimensions and relative dispositions of the parts may be made without departing from the spirit of the invention and for this reason it is not desired that I be limited only to the details and the mode of operation.

Having thus described my invention, what I claim as new therein and desire to secure by Letters-Patent, is:

1. The combination with a bicycle, of a platform supported above the latter from the frame thereof and means at the forward and rearward ends of the platform whereby a trained animal may mount and descend from the same.

2. The combination with a dirigible wheeled vehicle, an elevated platform supported from the vehicle frame, a ladder suspended from one end of the platform and a chute leading downwardly from the other end thereof.

3. In combination, a dirigible wheeled vehicle, adapted to be operated by a trained animal, a frame detachably connected to the vehicle frame, a platform mounted on said frame, a ladder leading upwardly to the platform and a chute leading downwardly therefrom; said ladder and chute being movable with the vehicle.

4. The combination with a bicycle of the character described of a plurality of posts detachably secured thereto, a platform supported on the posts above the bicycle, a ladder detachably connected with the platform and extending downwardly therefrom at one end of the bicycle and a chute detachably secured to the platform and extending downwardly therefrom to the opposite end of the bicycle.

5. The combination with a bicycle of the character described of a plurality of posts detachably secured thereto, a platform supported on the posts above the bicycle, a ladder detachably connected with the platform and extending downwardly therefrom at one end of the bicycle and a chute detachably secured to the platform and extending downwardly therefrom to the opposite end of the bicycle, and brace members for supporting lower ends of the ladder and chute from the vehicle frame.

6. In combination, with a bicycle of the character described, a plurality of posts detachably secured to the vehicle frame, a platform removably supported upon said posts, a ladder detachably connected with the platform and bicycle frame, a chute detachably connected with the platform and bicycle frame at the end opposite the ladder, said chute being provided with an opening at substantially the level of the eyes of an animal that may be operating the vehicle and rollers supported horizontally across said opening.

Signed at Seattle, King County, Washington, this 21st day of August, 1923.

EMIL PALLENBERG.